N. A. Dyar,
Cement for Roofing,
Nº 23,882. Patented May 3, 1859.

Witnesses
J. B. Crosby
Gordon McKay

Inventor
N. A. Dyar

UNITED STATES PATENT OFFICE.

NATHAN A. DYAR, OF MEDFORD, ASSIGNOR TO HIMSELF AND RUFUS KENDRICK, OF CAMBRIDGE, MASSACHUSETTS.

IMPROVEMENT IN CEMENT FOR ROOFING.

Specification forming part of Letters Patent No. 23,882, dated May 3, 1859.

*To all whom it may concern:*

Be it known that I, NATHAN A. DYAR, of Medford, in the county of Middlesex and State of Massachusetts, have invented a new and useful article of manufacture, by a new combination of materials, constituting a new result or production in the form of a vendible article, which is well adapted to the covering of roofs and walls for the purpose of rendering them water-tight; and I do hereby declare that the following is a full, clear, and exact description of the said new article of manufacture, and that it is sufficient to enable those who are skilled in the art to which it appertains to practice my invention, reference being had to the drawings which accompany and form part of this specification, and to the letters of reference thereon marked, similar letters referring to similar parts in both figures of the drawings.

Figure 1:
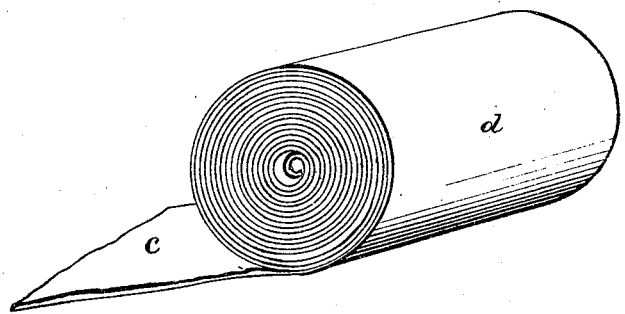
Figure 2:

Figure 1 is a view of the article as it appears, put up in rolls for transportation or sale. Fig. 2 is a sectional view, on an enlarged scale, of a portion of the new article, showing the different layers of which it is composed and their relative arrangement to each other.

*a* represents canvas, cloth, or felt, or any of their equivalents, the object of which is to give the requisite strength to the manufactured article and to serve as a base to which is united on each side, for the purpose of rendering the article water-proof, pitch, tar, asphaltum, gums, resin, or any equivalents therefor, separate or mixed in any desired proportion, with or without animal, vegetable, or mineral oils, or any equivalent or equivalents therefor. This water-proofing is represented by *b*, and is fixed upon *a* in about equal layers on each side by passing it *a* through hot melted water-proofing *b*.

*c* is common beach-sand, or its equivalent, which is spread upon one of the layers of water-proofing *b* while it is in a hot semi-fluid state. The sand embeds into the water-proofing and forms that side of the article which is presented to the action of the weather. Upon the other layer *b* a sheet of paper is fixed while the water-proofing is in a warm and plastic state. The papered side of the article is that which is placed in contact with the surface to be covered.

It has long been a desideratum to produce a water-proof covering which, by being complete in itself, could be applied, like the old metallic, slate, and wooden roof coverings, simply by the use of nails, and which, like such coverings, could be transported, ready for application by men ordinarily skilled in building or repairing operations. The present method of applying composition or mastic or otherwise styled similar roof-coverings involves the use of fire upon the premises where the application is made, which is highly dangerous. It involves, also, the transportation of melting-kettles, and requires the services of men particularly conversant with the trade and who are only to be found in somewhat populous places. The fumes also which arise from the melting and the application of the hot melted composition are often offensive.

My invention is best and most economically completely prepared for use and sale away from the places where it is to be finally located, and where, by proper appliances, skilled labor and the manufacture of large quantities, it can be produced at the minimum cost, and where, if the water-proofing is of a nature to emit disagreeable fumes, no one is inconvenienced except those employed in the manufacture.

My roof-covering can be packed in rolls of size and weight convenient for handling. The sanded and papered surfaces coming into contact in the roll do not adhere together and the article requires no boxing in transportation. It is nailed to the surface to be covered, the edges and ends of one sheet overlapping the edges and ends of other sheets, and this may be done in such a manner as to cover the nails. The overlapping portions are wet with spirits of turpentine upon the papered side previous to securing the sheet in its place. This causes a softening of the water-proofing and permits the removal of the paper, so that a union can be effected by pressure between the sheet which has been secured and the one overlapping it.

It will be obvious that my invention can be applied as a water-proof covering by any carpenter or slater, or, indeed, by any person who can drive nails with a hammer.

I do not herein intend to claim any particular process of manufacture, any particular composition of materials forming the water-proofing *b*, or any plan or system of the application of sheets of water-proof covering, as all of these may be greatly varied without departing from my invention, which consists in the relative arrangement of layers, as and for the purpose before set forth, as I consider that the process, composition, and system aforesaid are the subject-matters for separate patents, and therefore I have not herein specified them.

I am aware that it is not new to cover one or both sides of cloth with water-proofing, and also that sand or its equivalent has been applied to the outward surfaces of the water-proofing thus affixed upon the cloth, and also that the article so made has been rolled up for transportation, ready in this state to be unrolled and tacked upon a roof without further work to complete its character as a water-proof roof-covering. I am aware that a roof-covering prepared similarly as above mentioned has been laid or fixed upon roofs covered with hot melted water-proof mixtures and then strewn with sand; but I do not claim these as my invention, as they do not have the layer of paper used by me.

I am aware of the invention patented to John B. Wands, in which strips of paper are first tacked over the cracks in the boarding, after which cotton cloth is placed upon the roof next and over the paper, and then layers of water-proofing, earthy matters, water-proofing and earthy matters are respectively built upon the cloth while it is upon the roof. This I do not in any way lay claim to, for the paper and the cloth are not united, but only placed in juxtaposition, neither do the layers have the same order and arrangement as in my invention, nor does the paper have the same function in Wands' invention that it has in mine.

I claim—

As a new article of manufacture, the water-proof roof-covering herein described, the same consisting of a central layer or web of cloth, or its equivalent, covered on both sides with adhering layers of water-proofing, the outward side of one of which is covered with a layer of paper fixed thereto by contact with the water-proofing while it is in a warm and plastic state, while upon and embedded in the outward side of the other layer of water-proofing while in the state just described is a layer of sand, or its equivalent, forming the uppermost or weather surface of the article.

In testimony whereof I hereunto set my hand and affix my seal this 20th day of December, A. D. 1858.

N. A. DYAR. [L. S.]

In presence of—
J. B. CROSBY,
GORDON McKAY.